United States Patent [19]

Model

[11] 4,153,800
[45] * May 8, 1979

[54] ISOINDOLINONE PIGMENTS

[75] Inventor: Ernst Model, Basel, Switzerland

[73] Assignee: Ciba-Geigy Corporation, Ardsley, N.Y.

[*] Notice: The portion of the term of this patent subsequent to Jan. 24, 1995, has been disclaimed.

[21] Appl. No.: 850,443

[22] Filed: Nov. 10, 1977

Related U.S. Application Data

[63] Continuation of Ser. No. 657,010, Feb. 10, 1976, Pat. No. 4,070,367.

[30] Foreign Application Priority Data

Feb. 20, 1975 [CH]  Switzerland ............... 2156/75

[51] Int. Cl.² ........................................ C07D 403/14
[52] U.S. Cl. ................................................ 548/305
[58] Field of Search ..................................... 548/305

[56]         References Cited
        U.S. PATENT DOCUMENTS

| | | | |
|---|---|---|---|
| 2,973,358 | 2/1961 | Pugin .................... | 260/325 PH |
| 3,816,448 | 6/1974 | Bitterli et al. .............. | 260/325 PH |
| 3,867,404 | 2/1975 | von der Crone et al. .... | 260/325 PH |
| 4,052,410 | 10/1977 | von der Crone et al. ........ | 548/305 |

OTHER PUBLICATIONS

Frey et al., Chem. Abst., 1976, vol. 85, 34645j.
Model et al., Chem. Abst., 1975, vol. 83, 61696s.
Bayer A.-G., Chem. Abst., 1970, vol. 72, 33250w.

*Primary Examiner*—Natalie Trousof
*Assistant Examiner*—Natalia Harkaway
*Attorney, Agent, or Firm*—Vincent J. Cavalieri; Joseph F. DiPrima

[57]                 ABSTRACT

Isoindolinone pigments of the formula

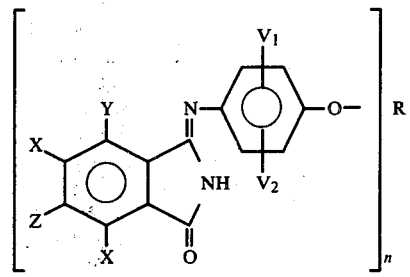

wherein R represents an aliphatic or cycloaliphatic radical, a cycloaliphatic, aromatic or heterocyclic radical to which the oxygen atoms are attached through alkyl or alkoxy groups, $V_1$ and $V_2$ represent hydrogen or halogen atoms, alkyl or alkoxy groups of 1 to 4 carbon atoms, X represents a halogen atom, Y and Z represent halogen atoms, alkoxy or alkylmercapto groups of 1 to 6 carbon atoms, cycloalkoxy groups of 5 to 6 carbon atoms, aralkoxy, aryloxy or arylmercapto groups, and n is an integer from 2 to 6, are valuable pigments coloring plastics, lacquers and printing inks in various yellow shades of excellent fastness properties and high color strength.

3 Claims, No Drawings

ISOINDOLINONE PIGMENTS

This is a continuation of application Ser. No. 657,010, filed on Feb. 10, 1976, now U.S. Pat. No. 4,070,367.

The invention provides useful new isoindolinone pigments of formula

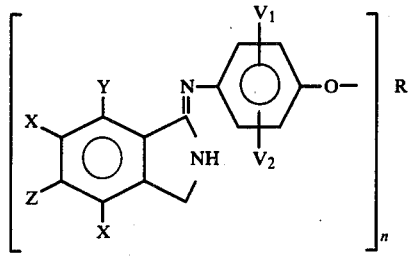 (I)

wherein R represents an aliphatic or cycloaliphatic radical, a cycloaliphatic, aromatic or heterocyclic radical to which the oxygen atoms are attached through alkyl or alkoxy groups, $V_1$ and $V_2$ represent hydrogen or halogen atoms, alkyl or alkoxy groups of 1 to 4 carbon atoms, X represents a halogen atom, Y and Z represent halogen atoms, alkoxy or alkylmercapto groups of 1 to 6 carbon atoms, cycloalkoxy groups of 5 to 6 carbon atoms, aralkoxy, aryloxy or arylmercapto groups, and n is an integer from 2 to 6.

Preferred isoindolinone pigments are those of formula

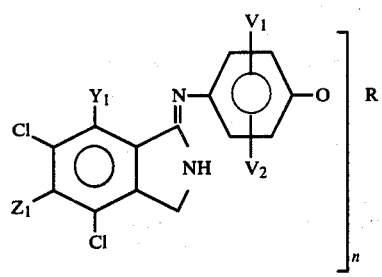 (II)

wherein R, $V_1$, $V_2$ and n are as defined hereinbefore, and $Y_1$ and $Z_1$ represent chlorine atoms or alkoxy groups containing 1 to 4 carbon atoms. Preferably $Y_1$ and $Z_1$ represent chlorine atoms.

In the given formulae, R preferably represents an alkylene group of 1 to 6 carbon atoms which can be interrupted by oxygen atoms or substituted by alkoxy groups of 1 to 6 carbon atoms, phenoxy or phenyl radicals which can additionally contain halogen atoms or alkyl or alkoxy groups of 1 to 4 carbon atoms, or represents a radical of formula

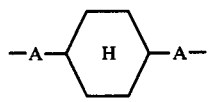

wherein A represents an alkylene or alkylenoxy group of 1 to 4 carbon atoms, and n is preferably an integer from 2 to 4.

The pigments of the present invention are obtained by condensing n moles of an isoindolinone of formula

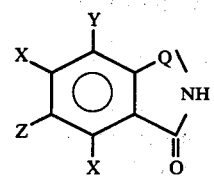 (IV)

wherein X, Y and Z are as defined hereinbefore and Q represents a group of formula

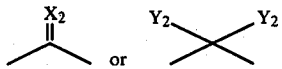

wherein $X_2$ represents an imino or thio group and $Y_2$ represents a halogen atom, an alkoxy group of 1 to 4 carbon atoms or a secondary amino group, with one mole of an amine of formula

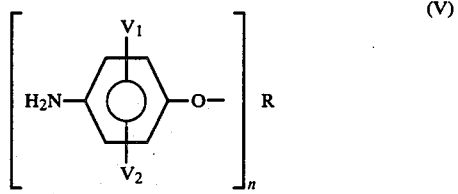 (V)

wherein R, $V_1$ and $V_2$ are as defined hereinbefore.

As starting materials there are preferably used isoindolinones of formula

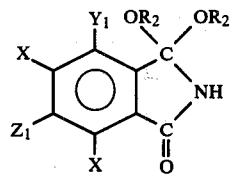 (VI)

wherein X, $Y_1$ and $Z_1$ have the meanings previously assigned to them and $R_2$ represents an alkyl group of 1 to 4 carbon atoms, and, in particular, those wherein X and $Y_1$ and $Z_1$ represent chlorine atoms. Those starting materials in which $Y_1$ and $Z_1$ represent chlorine atoms are known, and those in which $Y_1$ and $Z_1$ represent alkoxy, cycloalkoxy, aralkoxy, aryloxy, alkylthio or arylthio grups are obtained by the process of German Offenlegungsschrift 2.301.863 by reacting an ammonium salt or ester of tetrachloro-o-cyanobenzoic acid, in a hydrophilic organic solvent, with a compound of formula $Y_1$Me, wherein $Y_1$ is as defined hereinbefore and Me represents an alkali metal atom, and, if required, esterifying the product obtained.

Examples of isoindolinones are:

3,3-dimethoxy-4,5,6,7-tetrachloro-insoindolinone
3,3-dimethoxy-4,5,6,7-tetrabromo-isoindolinone
3,3,6-trimethoxy-4,5,7-trichloro-isoindolinone
3,3-dimethoxy-4,5,7-trichloro-6-butoxy-isoindolinone
3,3-dimethoxy-4,5,7-trichloro-6-phenoxy-isoindolinone
3,3-dimethoxy-4,5,7-trichloro-6-(p-chlorophenoxy)-isoindolinone
3,3-dimethoxy-4,5,7-trichloro-6-(o-methylphenoxy)-isoindolinone
3,3-dimethoxy-4,5,7-trichloro-6-methylmercapto-isoindolinone 3,3-dimethoxy-4,5,7-trichloro-6-ethylmercapto-isoindolinone
3,3,4,6-tetramethoxy-dichloro-isoindolinone.

As amines, there are preferably used those of formula V, wherein R represents an alkylene group of 1 to 6 carbon atoms which can be interrupted by oxygen atoms or substituted by alkoxy groups of 1 to 6 carbon atoms, phenoxy or phenyl radicals which can additionally contain halogen atoms, alkyl or alkoxy groups of 1 to 4 carbon atoms, or those wherein R represents a radical of formula (III).

These amines are obtained by known processes, for example (a) by condensing a nitrochlorobenzene of formula

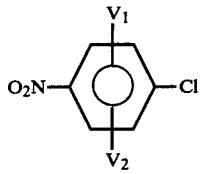

wherein $V_1$ and $V_2$ have the meanings previously assigned to them, with a polyol and potassium hydroxide solution in an aprotic solvent, for example dimethyl sulphoxide, and reducing the resultant nitroether to the aminoether, or (b) by condensing the sodium salt of a nitrophenol of formula

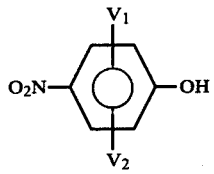

with a corresponding polyhalogeno compound and reducing the nitroether obtained to the aminoether.

Examples of nitrochlorobenzenes are:

1-chloro-4-nitrobenzene
1,2-dichloro-4-nitrobenzene
1-chloro-2-methyl-4-nitrobenzene
1-chloro-2-methoxy-4-nitrobenzene.

Examples of suitable polyols are alkane diols, triols, tetraols, pentaols or hexaols, for instance ethylene glycol
propylene glycol
glycerol
2,3-dihydroxybutane
2,2-dimethyl-1,3-dihydroxypropane
2-methyl-2-hydroxymethyl-1,3-dihydroxypropane
2-ethyl-2-hydroxymethyl-1,3-dihydroxypropane
pentaerythritol or dulcitol.

Examples of alkane polyols whose alkylene radical is interrupted by an oxygen atom are:

2,2'-dimethylol-cyclopentane
1,4-dihydroxycyclohexane
1,4-dimethylolcyclohexane
1,1-dimethylolcyclohexane
1,1-di-β-hydroxyethyl-cyclohexane.

Examples of aromatic polyols are:

1,4-dimethylol-benzene
1,4-di-β-hydroxyethyl
1,4-di-β-hydroxyethoxy-benzene as well as the compounds of formulae

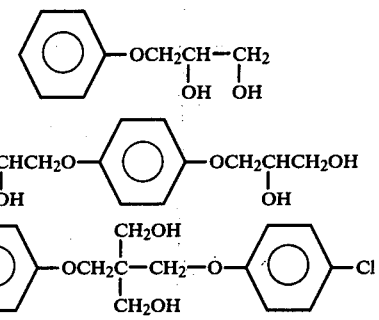

Examples of heterocyclic polyols are:

1-phenyl-3,5-bis-β-hydroxyethoxy-s-triazine
1,3,5-tris-β-hydroxyethoxy-s-triazine
1,3-bis-β-hydroxyethyl-benzimidazolone
1,3-bis-β-hydroxyethyl-tetrachlorobenzimidazolone.

Finally, mention may also be made of unsaturated aliphatic diols, for example 1,4-dihydroxybutylene.

The amines in which R represents a methylene group or a group of formula —CH$_2$—O—CH$_2$ are obtained preferably by process (b), i.e. by condensing methylene chloride or bromide or dichloride methyl ether with the corresponding nitrophenol.

The condensation of the halogenoisoindolinone with the amine takes place partially at low temperature, where appropriate by heating the intimately mixed components, with particular advantage in the presence of inert organic solvents, i.e. solvents that do not participate in the reaction.

Where 3-imino-, 3-thio- or 3,3-bis-sec.amino-4,5,6-tetrachloroisoindolin-1-ones or alkali salts of 3,3-dialkoxy-4,5,6,7-tetrachloroisoindolin-1-ones are used as starting materials, then it is advantageous to use water-miscible organic solvents, e.g. lower aliphatic alcohols, such as lower alkanols, for example methanol, isopropanol or butanol, lower cyclic ethers, such as dioxan, ethylene glycol monomethyl ether, lower aliphatic ketones, such as acetone. In doing so, the condensation is able to take place even at relatively low temperatures. It is advantageous to perform the reaction in the presence of an agent binding alkali and organic bases, for example a lower fatty acid which can be used simultaneously as solvent, especially acetic acid.

If the starting material is a 3,3-dihalogeno-4,5,6,7-tetrachloroisoindolin-1-one it is preferred to use an organic solvent that does not contain hydroxy groups, for example an aromatic hydrocarbon, such as benzene, toluene, xylene, tetrahydronaphthalene or diphenyl; a cycloaliphatic hydrocarbon, for example cyclohexane; a halogenated aliphatic hydrocarbon, for example carbon tetrachloride or tetrachloroethylene, or a halogenated aromatic hydrocarbon, for example chlorobenzene or di- and trichlorobenzene; also a nitrohydrocarbon, for example nitrobenzene; an aliphatic ether, for example dibutyl ether; an aromatic ether, for example diphenyl ether, or a cyclic ether, for example dioxan;

also a ketone, for example acetone; or an ester, for example an ester of a lower fatty acid with a lower alkanol, for example ethyl acetate, in the presence of an acid acceptor.

Directly after their formation the pigments of the present invention fall out of the reaction mixture. For certain purposes they can be used direct as crude pigments; but their properties, especially with respect to purity, form, and hiding power, can also be improved by known methods, for example by extraction with organic solvents or by grinding with grinding assistants which can afterwards be removed, for example salts, or by precipitation with an alkali.

The new colourants constitute useful pigments which, in finely divided form, can be used for pigmenting organic material of high molecular weight, for example cellulose ethers and esters, such as ethyl cellulose, acetyl cellulose, nitrocellulose, polyamides and polyurethanes or polyesters, natural resins or synthetic resins, such as polymerisation or condensation resins, for example aminoplasts, in particular urea/formaldehyde and melamine/formaldehyde resins, alkyd resins, phenolic plastics, polycarbonates, polyolefins, such as polystyrene, polyvinyl chloride, polyethylene, polypropylene, polyacrylonitrile, polyacrylic esters, thermoplastic or curable acrylic resins, rubber, casein, silicon and silicone resins, singly or in mixtures.

It is immaterial whether the cited materials of high molecular weight are in the form of plastics, melts or of spinning solutions, lacquers, paints or printing inks. Depending on the use to which they are put, it is advantageous to use the new pigments as toners or in the form of preparations.

The colourations obtained are characterised by high colour strength, brilliance and dispersibility, great purity of shade, good transparency and good fastness to alkali, overstripe bleeding, light, migration and weather.

Compared with the nearest comparable pigments of German patent 1.098.126, i.e. with those that also contain no conjugated double bond system, the pigments of the present invention are characterised by a surprisingly high colour strength.

In the following Examples which illustrate the invention the parts and percentages are by weight.

EXAMPLE 1

A hot solution of 6.25 g of tetra-(p-aminophenoxymethyl)-methane in 200 ml of 1,2-dichlorobenzene is added to a solution of 17 g of 3,3,4,5,6,7-hexachloroisoindolin-1-one in 100 ml of 1,2-dichlorobenzene. A yellow precipitate forms immediately. The suspension is heated with stirring to 160° to 170° C. and kept thereat for 2 hours.

The insoluble pigment is filtered off at 130° C. and washed with methanol, acetone and water. It is then dried to yield 16 g of a yellow powder, which can be used direct in this form for colouring plastics. The colourations obtained are characterised by outstanding fastness properties.

EXAMPLE 2

16.5 g of 3,4,5,6-tetrachlorocyanobenzoic acid methyl ester are stirred in 55 ml of a normal sodium methylate solution in methanol until a clear solution is obtained. The sodium salt of 3,3-dimethoxy-4,5,6,7-tetrachloroisoindolin-1-one forms. With good stirring, 5.8 g of di-[p-aminophenoxy]-methane and 100 ml of o-dichlorobenzene are added. The temperature is then raised to 100° C. while methanol distills off. A clear solution forms temporarily, then the sodium salt of the pigment precipitates. The batch is diluted with a further 100 ml of o-dichlorobenzene and acidified with 20 ml of glacial acetic acid. The temperature is raised to 140°–150° C. and kept thereat for 2 hours with good stirring. The insoluble pigment is filtered off at 120° C., washed with methanol, acetone and water, and dried, to yield 18 g of a productive yellow pigment, which in this form, or after it has been ground by one of the conventional methods, can be used for colouring plastics and for obtaining printing pastes and lacquers. The colourations obtained therewith are characterised by outstanding fastness properties.

EXAMPLE 3

By using equimolar amounts of 3,4,6-trichloro-5-methoxy-o-cyanobenzoic acid methyl ester instead of 3,4,5,6-tetrachlorocyanobenzoic acid methyl ester, a much more greenish yellow pigment is obtained which, when incorporated into plastics, printing pastes and lacquers, has similarly good properties.

EXAMPLE 4

A yellow pigment with similar properties is obtained by substituting 3,4,5,6-tetrabromo-o-cyanobenzoic acid methyl ester for 3,4,5,6-tetrachloro-o-cyanobenzoic acid methyl ester in Example 2.

EXAMPLES 5–109

The following table describes further pigments of formula

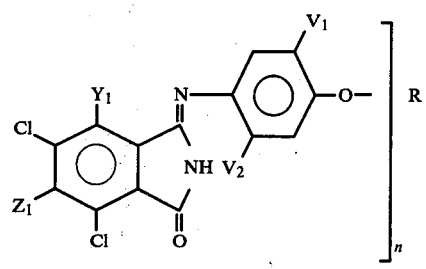

which are obtained by condensing a o-cyanobenzoic acid methyl ester of formula

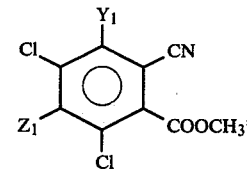

with a diamine or polyamine of formula

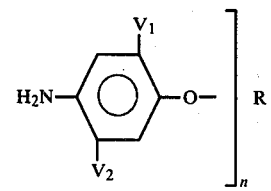

The meaning of the symbols is indicated in columns II–VII and the shade of a 2% polyvinyl chloride colouration obtained with the pigments is given in column VIII.

| No. | $Z_1$ | $Y_1$ | $V_1$ | $V_2$ | R | n | Shade |
|---|---|---|---|---|---|---|---|
| 5 | Cl | Cl | H | H | $-CH_2CH_2-$ | 2 | yellow |
| 6 | $OCH_3$ | Cl | H | H | $-CH_2CH_2$ | 2 | greenish yellow |
| 7 | Cl | Cl | Cl | H | $-CH_2CH_2-$ | 2 | greenish yellow |
| 8 | $OCH_3$ | Cl | H | H | $-CH_2CH_2-$ | 2 | greenish yellow |
| 9 | $OCH_3$ | $OCH_3$ | H | H | $-CH_2CH_2-$ | 2 | greenish yellow |
| 10 | $OCH_3$ | $OCH_3$ | Cl | H | $-CH_2CH_2-$ | 2 | greenish yellow |
| 11 | Cl | Cl | $CH_3$ | H | $-CH_2CH_2-$ | 2 | yellow |
| 12 | Cl | Cl | $OCH_3$ | H | $-CH_2CH_2-$ | 2 | reddish yellow |
| 13 | Cl | Cl | H | H | $CH_3\overset{\mid}{C}HCH_2-$ | 2 | yellow |
| 14 | Cl | Cl | Cl | H | $CH_3\overset{\mid}{C}HCH_2-$ | 2 | greenish yellow |
| 15 | Cl | Cl | H | H | $-CH_2CH_2CH_2-$ | 2 | yellow |
| 16 | $OCH_3$ | Cl | Cl | H | $-CH_2CH_2CH_2-$ | 2 | greenish yellow |
| 17 | Cl | Cl | Cl | H | $-CH_2CH_2CH_2-$ | 2 | greenish yellow |
| 18 | $OCH_3$ | Cl | H | H | $-CH_2CH_2CH_2-$ | 2 | greenish yellow |
| 19 | Cl | Cl | H | H | $CH_3\overset{\mid}{C}H\overset{\mid}{C}HCH_3$ | 2 | yellow |
| 20 | $OCH_3$ | Cl | H | H | $CH_3\overset{\mid}{C}H\overset{\mid}{C}HCH_3$ | 2 | greenish yellow |
| 21 | Cl | Cl | Cl | H | $CH_3\overset{\mid}{C}H\overset{\mid}{C}HCH_3$ | 2 | yellow |
| 22 | Cl | Cl | H | H | $-CH_2CH_2\overset{\mid}{C}HCH_3$ | 2 | yellow |
| 23 | Cl | Cl | Cl | H | $-CH_2CH_2\overset{\mid}{C}HCH_3$ | 2 | yellow |
| 24 | Cl | Cl | H | H | $-CH_2CH_2CH_2CH_2-$ | 2 | yellow |
| 25 | $OCH_3$ | Cl | H | H | $-CH_2CH_2CH_2CH_2-$ | 2 | greenish yellow |
| 26 | Cl | Cl | Cl | H | $-CH_2CH_2CH_2CH_2-$ | 2 | greenish yellow |
| 27 | $OCH_3$ | Cl | Cl | H | $-CH_2CH_2CH_2CH_2-$ | 2 | greenish yellow |
| 28 | Cl | Cl | H | H | $-CH_2CH=CH-CH_2-$ | 2 | yellow |
| 29 | Cl | Cl | Cl | H | $-CH_2CH=CH-CH_2-$ | 2 | greenish yellow |
| 30 | Cl | Cl | H | H | $-CH_2-\underset{CH_3}{\overset{CH_3}{\overset{\mid}{C}}}-CH_2-$ | 2 | reddish yellow |
| 31 | $OCH_3$ | Cl | H | H | " | 2 | yellow |
| 32 | Cl | Cl | H | H | " | 2 | yellow |
| 33 | Cl | Cl | H | $CH_3$ | $-CH_2-$ | 2 | yellow |
| 34 | $OCH_3$ | Cl | H | $CH_3$ | " | 2 | greenish yellow |
| 35 | Cl | Cl | Cl | H | " | 2 | greenish yellow |
| 36 | Cl | Cl | H | H | $-CH_2CH_2CH_2CH_2CH_2CH_2-$ | 2 | reddish yellow |
| 37 | Cl | Cl | Cl | H | " | 2 | yellow |
| 38 | Cl | Cl | H | H | $-CH_2CH_2OCH_2CH_2-$ | 2 | reddish yellow |
| 39 | Cl | Cl | Cl | H | " | 2 | yellow |
| 40 | $OCH_3$ | Cl | Cl | H | " | 2 | greenish yellow |
| 41 | Cl | Cl | $CH_3$ | H | " | 2 | reddish yellow |
| 42 | Cl | Cl | $OCH_3$ | H | " | 2 | reddish yellow |
| 43 | Cl | Cl | H | H | $-\underset{CH_3}{\overset{\mid}{C}H}-CH_2OCH_2\underset{CH_3}{\overset{\mid}{C}H}-$ | 2 | yellow |

-continued

| No. | $Z_1$ | $Y_1$ | $V_1$ | $V_2$ | R | n | Shade |
|---|---|---|---|---|---|---|---|
| 44 | $OCH_3$ | Cl | H | H | " | 2 | yellow |
| 45 | Cl | Cl | Cl | H | " | 2 | yellow |
| 46 | Cl | Cl | H | H | 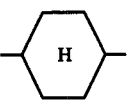 | 2 | yellow |
| 47 | Cl | Cl | Cl | H | " | 2 | yellow |
| 48 | Cl | Cl | H | H | 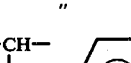 | 2 | yellow |
| 49 | $OCH_3$ | Cl | H | H | " | 2 | greenish yellow |
| 50 | Cl | Cl | Cl | H | " | 2 | greenish yellow |
| 51 | Cl | Cl | H | H | 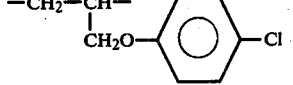 | 2 | reddish yellow |
| 52 | Cl | Cl | Cl | H | " | 2 | yellow |
| 53 | $OCH_3$ | Cl | Cl | H | " | 2 | greenish yellow |
| 54 | $OCH_3$ | $OCH_3$ | H | H | " | 2 | yellow |
| 55 | Cl | Cl | H | H | $-CH_2OCH_2-$ | 2 | yellow |
| 56 | $OCH_3$ | Cl | H | H | " | 2 | greenish yellow |
| 57 | Cl | Cl | H | H | 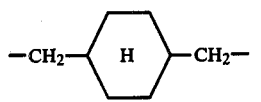 | 2 | yellow |
| 58 | Cl | Cl | Cl | H | " | 2 | yellow |
| 59 | Cl | Cl | H | H | 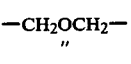 | 2 | yellow |
| 60 | Cl | Cl | Cl | H | " | 2 | yellow |
| 61 | Cl | Cl | H | H | 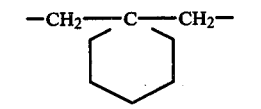 | 2 | greenish yellow |
| 62 | $OCH_3$ | Cl | Cl | H | " | 2 | greenish yellow |
| 63 | Cl | Cl | Cl | H | " | 2 | greenish yellow |
| 64 | Cl | Cl | H | H | 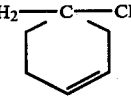 | 2 | yellow |
| 65 | Cl | Cl | H | H | 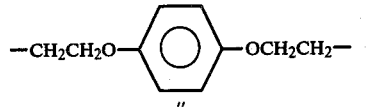 | 2 | greenish yellow |
| 66 | Cl | Cl | H | H | 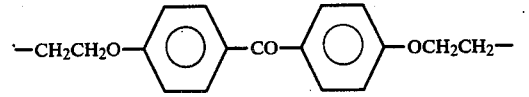 | 2 | greenish yellow |
| 67 | $OCH_3$ | Cl | H | H | " | 2 | greenish yellow |
| 68 | Cl | Cl | H | H | 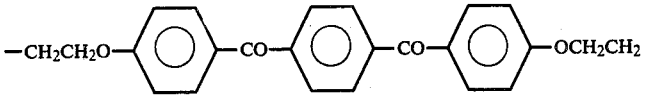 | 2 | yellow |

-continued

| No. | $Z_1$ | $Y_1$ | $V_1$ | $V_2$ | R | n | Shade |
|---|---|---|---|---|---|---|---|
| 69 | Cl | Cl | H | H | 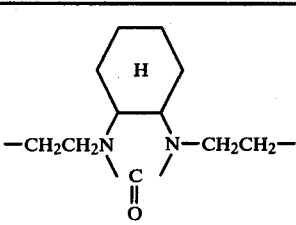 | 2 | yellow |
| 70 | Cl | Cl | H | H | " | 2 | yellow |
| 71 | OCH$_3$ | Cl | H | H | " | 2 | yellow |
| 72 | Cl | Cl | Cl | H | " | 2 | greenish yellow |
| 73 | Cl | Cl | H | H | 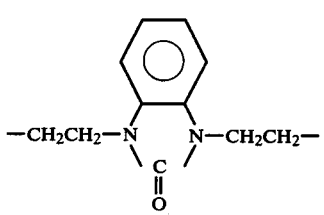 | 2 | reddish yellow |
| 74 | OCH$_3$ | Cl | H | H | " | 2 | yellow |
| 75 | Cl | Cl | Cl | H | " | 2 | greenish yellow |
| 76 | Cl | Cl | H | H | 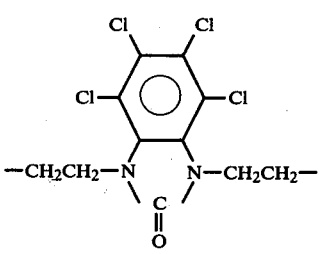 | 2 | yellow |
| 77 | OCH$_3$ | Cl | Cl | H | " | 2 | yellow |
| 78 | Cl | Cl | Cl | H | " | 2 | yellow |
| 79 | Cl | Cl | H | H | $-CH_2-CH-CH_2-$ | 3 | yellow |
| 80 | OCH$_3$ | Cl | H | H | " | 3 | greenish yellow |
| 81 | Cl | Cl | Cl | H | " | 3 | yellow |
| 82 | OCH$_3$ | Cl | Cl | H | " | 3 | greenish yellow |
| 83 | OCH$_3$ | OCH$_3$ | Cl | H | " | 3 | greenish yellow |
| 84 | Cl | Cl | H | H | 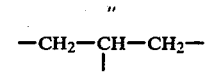 | 3 | reddish yellow |
| 85 | OCH$_3$ | Cl | H | H | " | 3 | greenish yellow |
| 86 | Cl | Cl | Cl | H | " | 3 | yellow |
| 87 | OCH$_3$ | Cl | Cl | H | " | 3 | yellow |
| 88 | Cl | Cl | H | H | 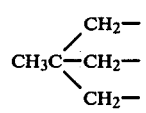 | 3 | reddish yellow |
| 89 | OCH$_3$ | Cl | H | H | " | 3 | greenish yellow |
| 90 | Cl | Cl | Cl | H | " | 3 | yellow |
| 91 | OCH$_3$ | Cl | Cl | H | " | 3 | greenish yellow |
| 92 | Cl | Cl | H | H | 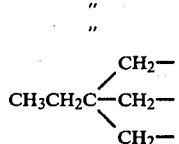 | 4 | yellow |
| 93 | OCH$_3$ | Cl | H | H | " | 4 | yellow |
| 94 | Cl | Cl | Cl | H | " | 4 | greenish yellow |

-continued

| No. | $Z_1$ | $Y_1$ | $V_1$ | $V_2$ | R | n | Shade |
|---|---|---|---|---|---|---|---|
| 95 | Cl | Cl | H | H | $-CH_2-CH-CH_2O-\langle\bigcirc\rangle-CO-\langle\bigcirc\rangle-OCH_2-CH-CH_2-$ | 4 | yellow |
| 96 | Cl | Cl | Cl | H | " | 4 | yellow |
| 97 | Cl | Cl· | H | H | (naphthalene bis-glycidyl ether structure) | 4 | yellow |
| 98 | OCH₃ | Cl | H | H | " | 4 | yellow |
| 99 | Cl | Cl | H | H | $-CH_2-CH-CH-CH_2-$ [meso Erythrit] | 4 | reddish yellow |
| 100 | Cl | Cl | H | H | $-CH_2-CH-CH-CH-CH_2-$ [Xylit] | 5 | yellow |
| 101 | Cl | Cl | H | H | $-CH_2-CH-CH-CH-CH-CH_2-$ [Dulcit] | 6 | greenish yellow |
| 102 | Cl | Cl | Cl | H | " | 6 | greenish yellow |
| 103 | OCH₃ | Cl | Cl | H | " | 6 | greenish yellow |
| 104 | Cl | Cl | H | H | $-CH_2-C(CH_2-)(CH_2-)-CH_2-$ | 4 | reddish yellow |
| 105 | Cl | Cl | Cl | H | " | 4 | greenish yellow |
| 106 | OCH₃ | Cl | H | H | " | 4 | yellow |
| 107 | OCH₃ | Cl | Cl | H | " | 4 | yellow |
| 108 | Cl | Cl | CH₃ | H | " | 4 | yellow |

EXAMPLE 109

2 g of the pigment obtained in Example 1 are gound with 36 g of toner dehydrate, 60 g of boiled linseed oil of medium viscosity and 2 g of cobalt linoleate on a three roll mill. The yellow prints obtained with the resultant colour paste are strong and outstandingly fast to light.

EXAMPLE 110

0.6 g of the pigment obtained in Example 3 is mixed with 67 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll mill. The greenish yellow colouration obtained is strong and fast to migration, heat and light.

EXAMPLE 111

10 g of titanium dioxide and 2 g of the pigment obtained in Example 2 are ground for 48 hours in a ball mill with 88 g of a mixture of 26.4 g of coconut alkyl resin, 24 g of melamine/formaldehyde resin (30% solids content), 8.8 g of ethylene glycol monomethyl ether and 28.8 g of xylene. The resultant lacquer is sprayed onto an aluminium sheet, predried for 30 minutes at room temperature and then stoved for 30 minutes at 120° C., to give a yellow finish which has very good colour strength and is characterised by very good fastness to overstripe bleeding, light and weathering.

I claim:

1. An isoindolinone pigment of the formula

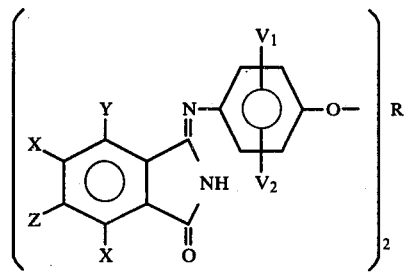

wherein R is a heterocyclic radical selected from the group consisting of

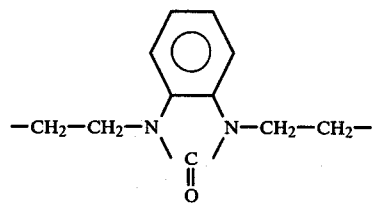

and

-continued

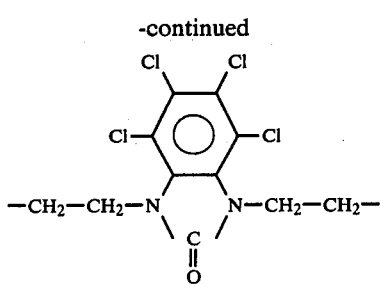

$V_1$ and $V_2$ represent hydrogen, halogen, alkyl containing 1 to 4 carbon atoms; X represents halogen; Y and Z represent halogen, alkoxy containing 1 to 6 carbon atoms, alkylmercapto containing 1 to 6 carbon atoms, or cycloalkoxy containing 5 or 6 carbon atoms.

2. An isoindolinone pigment according to claim 1 of the formula

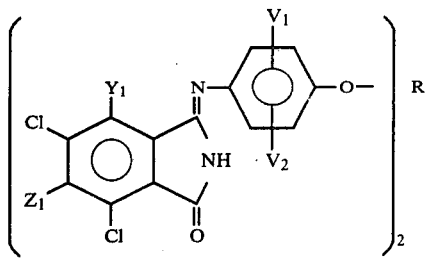

wherein $Y_1$ and $Z_1$ represent chloro or alkoxy of 1 to 4 carbon atoms.

3. An isoindolinone pigment according to claim 2, wherein $Y_1$ and $Z_1$ represent chlorine atoms.

* * * * *